United States Patent
Lin

(10) Patent No.: US 11,521,310 B2
(45) Date of Patent: Dec. 6, 2022

(54) IMAGE MARKING METHOD AND COMPUTING DEVICE IMPLEMENTING IMAGE MARKING METHOD

(71) Applicant: HON HAI PRECISION INDUSTRY CO., LTD., New Taipei (TW)

(72) Inventor: Jung-Yi Lin, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 103 days.

(21) Appl. No.: 17/067,732

(22) Filed: Oct. 11, 2020

(65) Prior Publication Data
US 2021/0374937 A1    Dec. 2, 2021

(30) Foreign Application Priority Data
May 29, 2020 (CN) .......................... 202010476697.5

(51) Int. Cl.
*G06K 9/00* (2022.01)
*G06T 7/00* (2017.01)
(Continued)

(52) U.S. Cl.
CPC ........ *G06T 7/0004* (2013.01); *G06K 9/00536* (2013.01); *G06K 9/6201* (2013.01);
(Continued)

(58) Field of Classification Search
CPC ........ G06K 9/00; G06K 9/00536; G06K 9/62; G06K 9/6201; G06K 9/6288; G06K 9/6289; G06K 9/629; G06K 9/6292; G06V 10/22; G06V 10/23; G06V 10/25; G06V 10/255; G06V 10/26; G06V 10/36; G06V 10/70; G06V 10/74; G06V 10/751; G06V 10/759; G06V 20/10; G06V 20/13; G06V 20/17; G06V 20/41; G06V 20/52; G06V 20/58; G06V 20/70; G06V 2201/03; G06V 2201/032; G06V 2201/05; G06V 2201/07; G06T 7/0002; G06T 7/0004; G06T 7/0012; G06T 7/10; G06T 7/70; G06T 7/74; G06T 2207/30004; G06T 2207/30108; G06T 2207/30204; G06T 2207/30242

USPC ........ 382/100, 103–105, 115, 117, 118, 128, 382/132, 133, 141–145, 149, 152, 164, 382/165, 173, 180, 181, 190, 195, 209, 382/216–218, 224, 282, 283, 291, 292; 707/723, 737, 748, 752; 342/90, 160; 345/629, 630, 632, 634–637, 639, 641
See application file for complete search history.

(56) References Cited

U.S. PATENT DOCUMENTS 9,665,802 B2 * 5/2017 Wang ..................... G06V 10/42
11,367,273 B2 * 6/2022 Du ......................... G06V 10/22
(Continued)

FOREIGN PATENT DOCUMENTS

| CN | 108038836 A | 5/2018 |
|---|---|---|
| CN | 108492299 | 9/2018 |
| TW | 202002578 A | 1/2020 |

*Primary Examiner* — Eric Rush
(74) *Attorney, Agent, or Firm* — ScienBiziP, P.C.

(57) ABSTRACT

An image marking method includes acquiring an image and at least one feature to be marked in the image, searching for at least one target area matching the at least one feature to be marked in the image, and marking the at least one target area with a preset graphic. The feature corresponds to the preset graphic.

15 Claims, 4 Drawing Sheets

(51) Int. Cl.
  G06K 9/62 (2022.01)
  G06V 10/22 (2022.01)
  G06T 7/70 (2017.01)
  G06V 10/25 (2022.01)
  G06V 10/74 (2022.01)
  G06T 7/73 (2017.01)

(52) U.S. Cl.
  CPC .............. G06T 7/70 (2017.01); G06T 7/74 (2017.01); G06V 10/22 (2022.01); G06V 10/23 (2022.01); G06V 10/25 (2022.01); G06V 10/74 (2022.01); *G06T 2207/30108* (2013.01)

(56) References Cited

U.S. PATENT DOCUMENTS

| | | | |
|---|---|---|---|
| 2012/0053446 A1* | 3/2012 | Lossev | G06K 9/6292 382/128 |
| 2014/0185925 A1* | 7/2014 | Datta | G06K 9/6256 382/159 |
| 2019/0304092 A1* | 10/2019 | Akselrod-Ballin | G06T 7/13 |
| 2019/0313963 A1* | 10/2019 | Hillen | G06K 9/6256 |
| 2019/0385018 A1* | 12/2019 | Ngo Dinh | G06K 9/6262 |
| 2021/0073977 A1* | 3/2021 | Carter | G06T 7/0012 |
| 2021/0357656 A1* | 11/2021 | Ren | G06V 10/52 |
| 2022/0076411 A1* | 3/2022 | Georgescu | G06V 10/454 |

* cited by examiner

IMAGE MARKING METHOD AND COMPUTING DEVICE IMPLEMENTING IMAGE MARKING METHOD

FIELD

The subject matter herein generally relates to the field of image processing, and particularly relates to an image marking method and a computing device implementing the image marking method.

BACKGROUND

With the development of artificial intelligence, image recognition technology has been applied to all fields of production and life. In the product manufacturing industry, image recognition technology is used to classify and mark product defects. Defect areas of products are generally marked manually, which is slow and has low accuracy.

BRIEF DESCRIPTION OF THE DRAWINGS

Implementations of the present disclosure will now be described, by way of embodiments, with reference to the attached figures.

DETAILED DESCRIPTION

Figure 1:
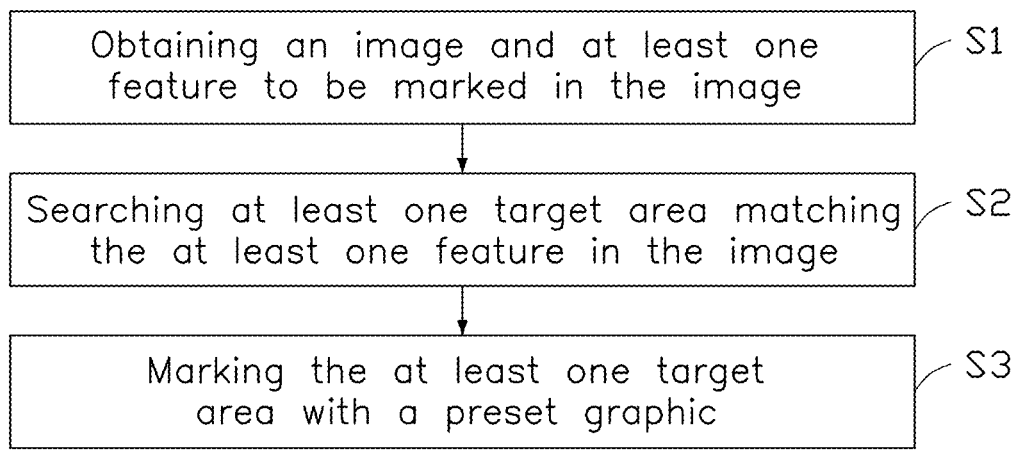
FIG. 1 is a flowchart of an image marking method.

It will be appreciated that for simplicity and clarity of illustration, where appropriate, reference numerals have been repeated among the different figures to indicate corresponding or analogous elements. Additionally, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "comprising" means "including, but not necessarily limited to"; it specifically indicates open-ended inclusion or membership in a so-described combination, group, series, and the like.

In general, the word "module" as used hereinafter refers to logic embodied in hardware or firmware, or to a collection of software instructions, written in a programming language such as, for example, Java, C, or assembly. One or more software instructions in the modules may be embedded in firmware such as in an erasable-programmable read-only memory (EPROM). It will be appreciated that the modules may comprise connected logic units, such as gates and flip-flops, and may comprise programmable units, such as programmable gate arrays or processors. The modules described herein may be implemented as either software and/or hardware modules and may be stored in any type of computer-readable medium or other computer storage device.

FIG. 1 shows a flowchart of an embodiment of an image marking method. According to different needs, the order of blocks in the flowchart can be changed, and some blocks can be omitted or combined.

The image marking method is applied to a computing device, and the computing device is used to obtain an image and at least one feature to be marked in the image, and to search for at least one target area in the image matching the at least one feature. A preset graphic is used to mark the at least one target area, wherein the feature corresponds to the preset graphic. The computing device may be an electronic device such as a personal computer installed with the image marking method.

At block S1, the image and the at least one feature to be marked in the image are obtained.

In one embodiment, the image is acquired by a camera located on a production device, and the image is sent to the computing device. The production device may include a plurality of production devices arranged in different production workshops and configured to perform different production processes, so that the computing device can obtain different inspection data of products from the different production workshops and the different production processes. The production device may be a test machine specially used by a manufacturer for testing product quality, or a production machine for producing the product. In other embodiments, the production device may also be a specific testing device used by a third-party testing agency to test product quality.

In another embodiment, the image may also be obtained in a database, and the database may be stored in the computing device, or may also be stored in a server or a cloud server.

In the field of product inspection, the feature can be a defect feature on a product surface, such as a scratch, uneven coating, and the like. In the field of image recognition, the feature may include pixel features of the image to be marked.

At block S2, the at least one target area matching the at least one feature is searched in the image.

In one embodiment, a method for searching for the at least one target area matching the at least one feature may include searching the entire image in a preset sequence according to the shape of the image. The preset sequence may include, but is not limited to, from top to bottom, from inside to outside, and from bottom to top.

In another embodiment, the method for searching may also include searching a partial area of the image to be marked.

At block S3, the at least one target area is marked with a preset graphic, and the feature corresponds to the preset graphic.

Figure 2:
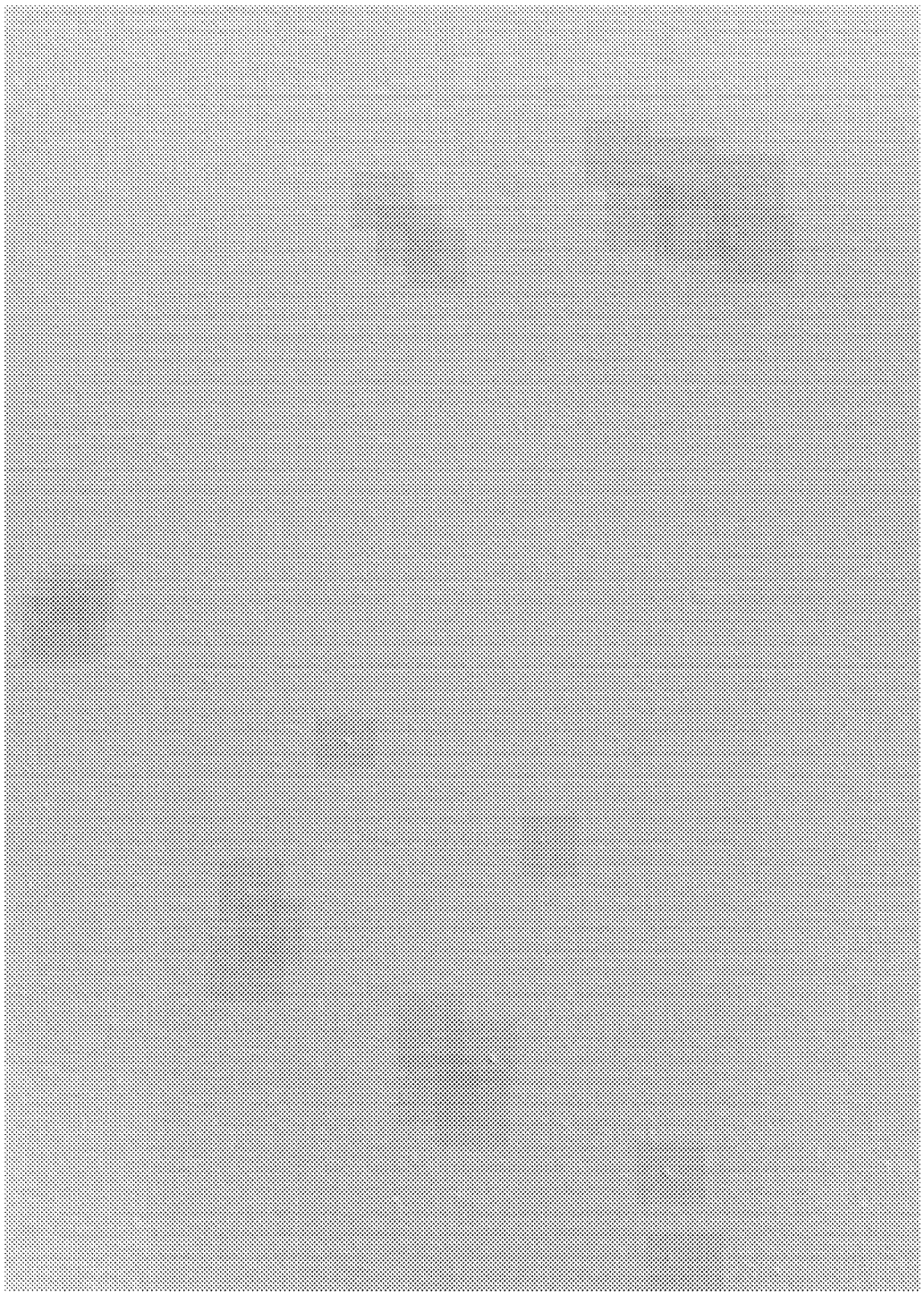
FIG. 2 is a schematic diagram of an image marked according to the image marking method in FIG. 1.

The preset graphic may be squares, rectangles, or other shapes having different colors and sizes. A marking method may set the preset graphic on the target area. For example, the preset graphic surrounds the target area or covers the target area. An area of the preset graphic may completely cover the target area, or may partially cover the target area. In one embodiment, the preset graphic is a square. Referring to FIG. 2, a plurality of target areas in the image is marked by squares. The target areas in FIG. 2 includes scratches, blemishes, and so on.

In another embodiment, the image marking method further includes:

Selecting a first preset graphic to identify at least one first target area in the target area;

Taking the first target area as a center, and searching whether there is a second target area within a preset step length matching the feature; and In response that there is a second target area, marking the second target area with the first preset graphic.

A starting point of the preset step length may be a center point of the first preset graphic, a midpoint of any side of the first preset graphic, or any set position.

In another embodiment, the image marking method further includes:

When the first target area overlaps the second target area, assigning a first weight to an overlapping area, and assigning a second weight to a non-overlapping area, and the first weight is greater than the second weight. The first weight is used to describe a credibility of the first target area, and the second weight is used to describe a credibility of the second target area. When the image includes a combination of the first target area, the second target area, and the overlapping area of the first target area and the second target area, the weights are sorted according to sizes, and a sorting result is generated. Among them, the areas with high weights have high credibility. In a process of subsequent image recognition, areas with high credibility can be identified. A key recognition method may include selecting different recognition algorithms to improve recognition accuracy, and performing multi-scale training on the areas to improve recognition accuracy.

In another embodiment, the image marking method further includes:

When the first target area is simultaneously marked by the first preset graphic and a second preset graphic, generating a prompt message, wherein the first preset graphic corresponds to a first feature, and the second preset graphic corresponds to a second feature. For example, the first feature corresponding to the first preset graphic is an image scratch, and the second feature corresponding to the second preset graphic is an image color error. When the first target area is marked by the two preset graphics, a prompt is generated to remind staff to provide solutions. The computing device receives and executes the solution provided according to the prompt message. The solution includes judging the information of the preset graphic corresponding to the target area.

Figure 3:
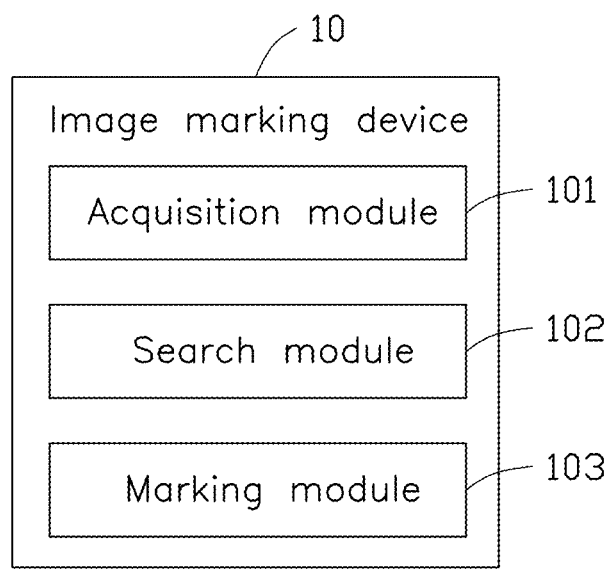
FIG. 3 is a schematic block diagram of an image marking device.

FIG. 3 is a structural diagram of an embodiment of an image marking device.

In one embodiment, the image marking device 10 runs in a computing device. The computing device is connected to a plurality of user terminals through a network. The image marking device 10 may include multiple functional modules composed of program code segments. The program code segments in the image marking device 10 may be stored in a memory of the computing device and executed by at least one processor to realize image marking functions.

In one embodiment, the image marking device 10 can be divided into a plurality of functional modules. Referring to FIG. 3, the functional modules may include an acquisition module 101, a search module 102, and a marking module 103.

The acquisition module 101 is configured to acquire an image and at least one feature to be marked in the image. The acquisition module may implement functions described in block S1 in FIG. 1, and will not be described here further.

The search module 102 is configured to search for at least one target area matching the at least one feature to be marked in the image. The search module 102 may implement functions described in block S2 in FIG. 1, and will not be described here further.

The marking module 103 is configured to mark the at least one target area with the preset graphic, and the feature corresponds to the preset graphic. The marking module 103 may implement functions described in block S3 in FIG. 1, and will not be described here further.

Figure 4:
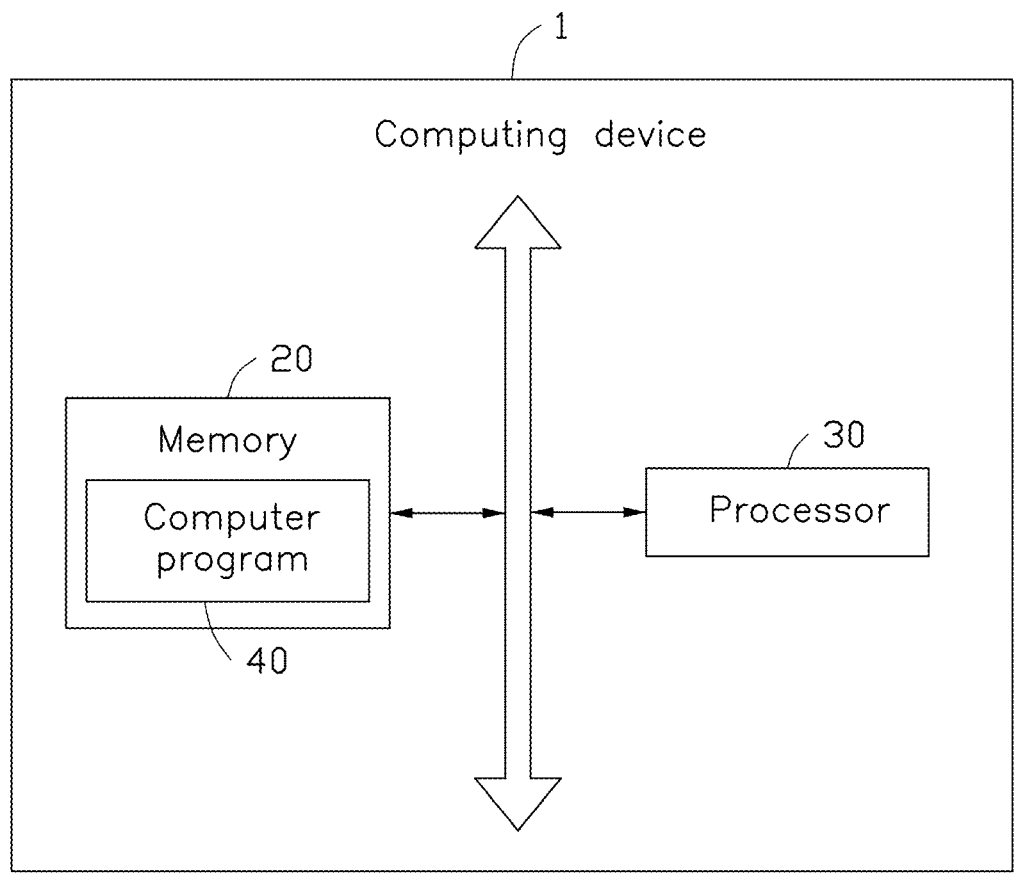
FIG. 4 is a schematic block diagram of a computing device.

FIG. 4 is a schematic diagram of an embodiment of a computing device 1.

The computing device 1 includes a memory 20, a processor 30, and a computer program 40 stored in the memory 20 and executed by the processor 30. When the processor 30 executes the computer program 40, the blocks in the image marking method described in FIG. 1 may be implemented. Alternatively, when the processor 30 executes the computer program 40, the functional modules of the image marking device 10 in FIG. 3 may be implemented.

Exemplarily, the computer program 40 may be divided into one or more modules, and the one or more modules are stored in the memory 20 and executed by the processor 30. The one or more modules may be a series of computer program instruction segments capable of completing specific functions, and the instruction segments are used to describe the execution process of the computer program 40 in the computing device 1. For example, the computer program 40 can be divided into the acquisition module 101, the search module 102, and the marking module 103 in FIG. 3.

In one embodiment, the computing device 1 may also be a computing device such as a desktop computer, a notebook, a palmtop computer, and a cloud terminal device. Those skilled in the art can understand that the schematic diagram is only an example of the computing device 1 and does not constitute a limitation of the computing device 1. It may include more or fewer components than those shown in the figure or have a combination of certain components or have different components. For example, the computing device 1 may also include input and output devices, network access devices, buses, and so on.

The processor 30 may be a central processing unit, other general-purpose processors, digital signal processors, application-specific integrated circuits, Field-Programmable Gate Array, or other programmable logic devices, discrete gates or transistor logic devices, discrete hardware components, etc. The general-purpose processor may be a microprocessor or the processor 30 may also be any conventional processor, etc. The processor 30 is the control center of the computing device 1 and connects the various parts of the entire computing device 1 through various interfaces and lines.

The memory 20 may be used to store the computer program 40 and/or modules. The processor 30 runs or executes the computer programs and/or modules stored in the memory 20 and calls the computer programs and/or modules stored in the memory 20. The data in the memory 20 realizes various functions of the computing device 1. The memory 20 may mainly include a program storage area and a data storage area. The program storage area may store an operating system, an application program required by at least one function (such as a sound playback function, an image playback function, etc.), or the like; the data (such as audio data, phone book, etc.) created according to the use of the computing device 1 is stored. In addition, the memory 20 may include a high-speed random access memory, and may also include a non-volatile memory, such as a hard disk, a memory, a plug-in hard disk, a smart memory card, and a secure digital card, Flash Card, at least one magnetic disk storage device, flash memory device, or another volatile solid-state storage device.

If the integrated modules of the computing device 1 are implemented in the form of a software function module and sold or used as an independent product, it can be stored in a computer readable storage medium. Based on this understanding, the present disclosure implements all or part of the processes in the above-mentioned embodiments and methods and can also be completed by instructing relevant hardware through a computer program. The computer program can be stored in a computer-readable storage medium. When the computer program is executed by the processor, it can implement the steps of the foregoing method embodiments. Wherein, the computer program includes computer program code, and the computer program code may be in the form of source code, object code, executable file, or some intermediate forms. The computer-readable medium may include any entity or device capable of carrying the computer program code, recording medium, U disk, mobile hard disk, magnetic disk, optical disk, computer memory, read-only memory, Random Access Memory, electrical carrier signal, telecommunications signal, and software distribution media, etc. It should be noted that the contents contained in the computer-readable medium can be appropriately added or deleted according to the requirements of the legislation and patent practice in the jurisdiction. For example, in some jurisdictions, according to the legislation and patent practice, the computer-readable medium does not include electrical carrier signals and telecommunication signals.

In the several embodiments provided by the present disclosure, it should be understood that the disclosed electronic device and method may be implemented in other ways. For example, the electronic device embodiments described above are only illustrative. For example, the division of the modules is only a logical function division, and there may be other division methods in actual implementation.

In addition, the functional modules in the various embodiments of the present disclosure may be integrated into the same processing module, or each module may exist alone physically, or two or more modules may be integrated into the same module. The above-mentioned integrated modules can be implemented in the form of hardware or in the form of hardware plus software functional modules.

For those skilled in the art, it is obvious that the present disclosure is not limited to the details of the above exemplary embodiments, and the present disclosure can be implemented in other specific forms without departing from the spirit or basic characteristics of the present disclosure. Therefore, from any point of view, the embodiments should be regarded as exemplary and non-limiting. The scope of the present disclosure is defined by the appended claims rather than the above description, and therefore it is intended to fall within the claims. All changes within the meaning and scope of the equivalent elements are included in the present disclosure. Any reference signs in the claims should not be regarded as limiting the claims involved. In addition, it is obvious that the word "include" does not exclude other modules or steps, and the singular does not exclude the plural. Multiple modules or electronic devices stated in the claims of an electronic device can also be implemented by the same module or electronic device through software or hardware. Words such as first and second are used to denote names, but do not denote any specific order.

What is claimed is:

1. An image marking method comprising:
   acquiring an image of a product using a camera and acquiring at least one first feature to be marked in the image, wherein the camera is located on a production device that is used to produce the product;
   searching for at least one first target area matching the at least one first feature to be marked in the image;
   marking the at least one first target area with a first preset graphic, the at least one first feature corresponding to the first preset graphic;
   taking the at least one first target area as a center, and searching whether there is a second target area within a preset step length matching the at least one first feature; and
   in response that there is the second target area, marking the second target area with the first preset graphic;
   in response that the at least one first target area overlaps the second target area, assigning a first weight to an overlapping area of the at least one first target area and the second target area, and assigning a second weight to a non-overlapping area, the first weight being greater than the second weight, wherein an area with a higher weight has a higher credibility;
   identifying areas from the image based on credibility; and
   improving recognition accuracy by performing multi-scale training based on the identified areas.

2. The image marking method of claim 1,
   wherein the first weight is used to describe a credibility of the at least one first target area, and the second weight is used to describe a credibility of the second target area.

3. The image marking method of claim 2, further comprising:
   generating a prompt message when the at least one first target area is simultaneously marked by the first preset graphic and a second preset graphic; and
   executing a solution provided according to the prompt message.

4. The image marking method of claim 3, further comprising:
   when the image comprises a combination of the at least one first target area, the second target area, and the overlapping area of the at least one first target area and the second target area, sorting corresponding weights according to sizes, and generating a sorting result.

5. The image marking method of claim 3,
   wherein the second preset graphic corresponds to a second feature, the second feature being different from the at least one first feature.

6. A computing device comprising:
   a processor; and
   a memory storing a plurality of instructions, which when executed by the processor, causes the processor to:
   acquire an image of a product using a camera and acquiring at least one first feature to be marked in the image, wherein the camera is located on a production device that is used to produce the product;
   search for at least one first target area matching the at least one first feature to be marked in the image;
   mark the at least one first target area with a first preset graphic, the at least one first feature corresponding to the first preset graphic;
   take the at least one first target area as a center, and search whether there is a second target area within a preset step length matching the at least one first feature; and in response that there is the second target area, mark the second target area with the first preset graphic;

in response that the at least one first target area overlaps the second target area, assign a first weight to an overlapping area of the at least one first target area and the second target area, and assign a second weight to a non-overlapping area, the first weight being greater than the second weight, wherein an area with a higher weight has a higher credibility;

identify areas from the image based on credibility; and improve recognition accuracy by performing multi-scale training based on the identified areas.

7. The computing device of claim 6,
wherein the first weight is used to describe a credibility of the at least one first target area, and the second weight is used to describe a credibility of the second target area.

8. The computing device of claim 7, wherein the processor is further configured to:
generate a prompt message when the at least one first target area is simultaneously marked by the first preset graphic and a second preset graphic; and
execute a solution provided according to the prompt message.

9. The computing device of claim 7, wherein the processor is further configured to:
when the image comprises a combination of the at least one first target area, the second target area, and the overlapping area of the at least one first target area and the second target area, sort corresponding weights according to sizes, and generate a sorting result.

10. The computing device of claim 6,
wherein the first preset graphic corresponds to a first feature, and the second preset graphic corresponding to a second feature, the second feature being different from the at least one first feature.

11. A non-transitory storage medium having stored thereon instructions that, when executed by at least one processor of a computing device, causes the at least one processor to execute instructions of an image marking method, the method comprising:
acquiring an image of a product using a camera and acquiring at least one first feature to be marked in the image, wherein the camera is located on a production device that is used to produce the product;
searching for at least one first target area matching the at least one first feature to be marked in the image;
marking the at least one first target area with a first preset graphic, the at least one first feature corresponding to the first preset graphic;
taking the at least one first target area as a center, and searching whether there is a second target area within a preset step length matching the at least one first feature; and
in response that there is the second target area, marking the second target area with the first preset graphic;
in response that the at least one first target area overlaps the second target area, assigning a first weight to an overlapping area of the at least one first target area and the second target area, and assigning a second weight to a non-overlapping area, the first weight being greater than the second weight, wherein an area with a higher weight has a higher credibility;
identifying areas from the image based on credibility; and
improving recognition accuracy by performing multi-scale training based on the identified areas.

12. The non-transitory storage medium of claim 11,
wherein the first weight is used to describe a credibility of the at least one first target area, and the second weight is used to describe a credibility of the second target area.

13. The non-transitory storage medium of claim 12, wherein the method further comprises:
generating a prompt message when the at least one first target area is simultaneously marked by the first preset graphic and a second preset graphic; and
executing a solution provided according to the prompt message.

14. The non-transitory storage medium of claim 13, wherein the method further comprises:
when the image comprises a combination of the at least one first target area, the second target area, and the overlapping area of the at least one first target area and the second target area, sorting corresponding weights according to sizes, and generating a sorting result.

15. The non-transitory storage medium of claim 13,
wherein the first preset graphic corresponds to a first feature, and the second preset graphic corresponds to a second feature, the second feature being different from the at least one first feature.

* * * * *